United States Patent
Demetry et al.

(10) Patent No.: US 11,941,700 B1
(45) Date of Patent: Mar. 26, 2024

(54) MEASURING RISK TOLERANCE USING VIRTUAL OR AUGMENTED REALITY VIEW OF SIMULATED OUTCOME

(71) Applicant: Wells Fargo Bank, N.A., San Francisco, CA (US)

(72) Inventors: Joshua T. Demetry, Menomonee Falls, WI (US); Brian J. Jacobsen, Elm Grove, WI (US); Shane C. Martwick, Wauwatosa, WI (US); Patrick E. McGuinnis, San Francisco, CA (US); Carolyn A. Wilary, Pewaukee, WI (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/976,506

(22) Filed: Oct. 28, 2022

Related U.S. Application Data

(63) Continuation of application No. 17/216,364, filed on Mar. 29, 2021, now Pat. No. 11,501,375, which is a continuation of application No. 15/393,145, filed on Dec. 28, 2016, now Pat. No. 10,963,964.

(51) Int. Cl.
| | |
|---|---|
| G06Q 40/06 | (2012.01) |
| G06F 3/01 | (2006.01) |
| G06F 30/20 | (2020.01) |
| G06Q 40/08 | (2012.01) |
| G06T 11/60 | (2006.01) |

(52) U.S. Cl.
CPC ............ *G06Q 40/06* (2013.01); *G06F 3/011* (2013.01); *G06F 30/20* (2020.01); *G06Q 40/08* (2013.01); *G06T 11/60* (2013.01)

(58) Field of Classification Search
CPC ...................................................... G06Q 40/06
USPC ...................................................... 705/36 R
See application file for complete search history.

(56) References Cited

U.S. PATENT DOCUMENTS

| | | |
|---|---|---|
| 5,774,878 A | 6/1998 | Marshall |
| 7,188,076 B2 | 3/2007 | Bensemana |
| 7,577,597 B1 | 8/2009 | Allison et al. |
| 7,831,494 B2 | 11/2010 | Sloan et al. |
| 9,030,495 B2 | 5/2015 | McCulloch et al. |

(Continued)

OTHER PUBLICATIONS

Wikipedia, Augmented Reality, Captured on Dec. 31, 2013, Internet Archive WayBack Machine (Year: 2013).*

(Continued)

*Primary Examiner* — Cho Kwong
(74) *Attorney, Agent, or Firm* — Foley & Lardner LLP

(57) ABSTRACT

One embodiment relates to a computing system. The computing system includes a risk analysis circuit. The risk analysis circuit is configured to simulate a plurality of investment outcomes. The risk analysis circuit is configured to display at least one augmented reality or virtual reality depiction of at least one of the plurality of investment outcomes via a display device. The risk analysis circuit is configured to monitor a reaction of a user to the displayed augmented reality or virtual reality depictions. The risk analysis circuit is configured to generate a user reaction score based on the reaction of the user. The risk analysis circuit is configured to generate an overall score for each of the plurality of investment outcomes by weighing the user reaction score and investment outcome.

18 Claims, 4 Drawing Sheets

(56) References Cited

U.S. PATENT DOCUMENTS

| | | |
|---|---|---|
| 9,317,835 B2 | 4/2016 | Calman et al. |
| 9,454,220 B2 | 9/2016 | Devries |
| 2012/0242696 A1 | 9/2012 | Martin |
| 2016/0035132 A1 | 2/2016 | Shuster et al. |
| 2016/0188585 A1 | 6/2016 | Durham et al. |
| 2016/0189426 A1 | 6/2016 | Thomas et al. |
| 2016/0253842 A1 | 9/2016 | Shapira et al. |
| 2018/0040161 A1 | 2/2018 | Tierney et al. |

OTHER PUBLICATIONS

Ergurel, Deniz, "How virtual and augmented reality can transform the future of FinTech?", https://haptic.al/how-virtual-and-augmented-reality-can-transform-the-future-of-fintech-3c52b0a79c34; Jun. 30, 2016. 7 pages.

Scheurle, Sebastian, "Can robo-advice spur stock market participation?", http://ssrn.com/abstract=2821207, Jul. 2016. 31 pages.

Schmerke, Ivy, "TD Ameritrade's New Mobile App Scans for Investment Opportunities", Wall Street & Technology, Feb. 22, 2012. 2 pages.

Sommerfeld et al., "To what extent will a "robo adviser" replace your financial adviser?", Inside magazine Issue 12, Part 01, Jun. 2016. 26 pages.

* cited by examiner

MEASURING RISK TOLERANCE USING VIRTUAL OR AUGMENTED REALITY VIEW OF SIMULATED OUTCOME

CROSS-REFERENCE TO RELATED PATENT APPLICATION

This application is a continuation of U.S. patent application Ser. No. 17/216,364, filed Mar. 29, 2021, which is a continuation of U.S. patent application Ser. No. 15/393,145, filed Dec. 28, 2016, now U.S. Pat. No. 10,963,964, the contents of each of which are incorporated herein by reference in their entireties.

BACKGROUND

Present methods for incorporating user's risk tolerance into investment planning schemes are unreliable. For example, users may be asked by a financial adviser if they are risk adverse and would prefer a low-risk investment plan (e.g., an investment plan having a high proportion of low-risk investments, such as bonds, treasury bills, or other debt investments). Unfortunately, users may not respond accurately to such inquiries. Users may, for example, suffer from psychological biases that leave them unable to wholly incorporate the potential risks associated with a specific investment plan into their decision-making. Thus, it would be beneficial to demonstrate risks to users in a more impactful way than a simple question or questionnaire and to accurately measure user responses to those risks.

SUMMARY

One embodiment relates to a financial institution computing system. The financial institution computing system can include a network circuit enabling the financial institution computing system to exchange information over a network. The financial institution computing system can also include a risk analysis circuit. The risk analysis circuit can be configured to simulate a plurality of investment outcomes for a first investment risk level. The risk analysis circuit can also be configured to display at least one augmented reality or virtual reality depiction of at least one of the investment outcomes via a display device. The risk analysis circuit can also be configured to monitor a reaction of the user to each displayed augmented reality or virtual reality depiction. The monitoring the reaction can include measuring biometric responses of the user with a monitoring device. The risk analysis circuit can also be configured to generate a user stress score by averaging normalized biometric response of the user. The risk analysis circuit can also be configured to generate an overall score for each of the plurality of investment outcomes by weighing the user stress score and investment outcome.

Another embodiment relates to a method of determining an investment risk tolerance of a user. The method can include simulating, by the risk analysis circuit, a plurality of investment outcomes for a first investment risk level. The method can also include displaying, by a display device, at least one augmented reality or virtual reality depiction of at least one of the investment outcomes to the user. The method can also include monitoring, by the financial institution computing system, a reaction of the user to each displayed augmented reality or virtual reality depiction. The monitoring of the reaction can include measuring biometric responses of the user with a monitoring device. The method can also include generating, by a user stress evaluation circuit, a user stress score by averaging normalized biometric responses of the user. The method can also include generating, by the user stress evaluation circuit, an overall score for each of the plurality of investment outcomes by weighing the user stress score and investment outcome.

Yet another embodiment relates to a non-transitory computer readable medium having computer-executable instructions embodied therein that, when executed by a risk analysis circuit of a financial institution computing system, causes the financial institution computing system to perform operations to measure a risk response of a user. The operations can include simulating a plurality of investment outcomes for a first investment risk level. The operations can also include displaying, by a display device, at least one augmented reality or virtual reality depiction of at least one of the plurality of investment outcomes. The operations can also include monitoring a reaction of the user to each displayed augmented reality or virtual reality depiction. The monitoring the reaction of the user can include measuring biometric response of the user with a monitoring device. The operations can also include generating a user stress score by averaging normalized biometric responses of the user. The operations can also include generating an overall score for each of the plurality of investment outcomes by weighing the user stress score and investment outcome.

DETAILED DESCRIPTION

Referring generally to the figures, systems and methods for measuring the risk tolerance of a user are shown. In various arrangements, a computing system associated with a financial institution receives information concerning a user and runs statistical simulations for at least one investment plan for the user to produce a series of projected financial outcomes. The computing system may then connect some of these projected outcomes to user information that is indicative of financial goals and life goals of the user (hereinafter referred to as "user goals"). Based on the projected financial outcomes, the computing system selects virtual or augmented reality content to present to the user on a display device. As the content is presented to the user, biometrics of the user are monitored by at least one sensing device. Based on these biometrics, the computing system estimates the user's tolerance to the risks associated with the investment plan. Thus, using the systems and methods employed herein, the user is presented with results of financial simulations in a way more likely to produce a meaningful reaction by the user that can be accurately measured via at least one biometric monitoring device. Accordingly, the user's true risk tolerance may be determined more accurately and an appropriate investment strategy may be chosen for the user based on the true risk tolerance of the user.

The embodiments and implementations of the systems and methods disclosed herein improve current systems for determining the risk tolerance of a user by measuring the biometric response of the user to depictions of simulated financial outcomes presented to the user in virtual or augmented reality experiences. These systems, methods, and computer implementations improve the accuracy of risk tolerance measuring procedures by presenting the user with virtual or augmented reality depictions of simulated financial outcomes to produce an authentic biometric response of the user. Additionally, the systems and methods disclosed herein further ensure that the biometric response of the user is authentic by selecting virtual or augmented reality depictions to be presented to the user based on information concerning the user (e.g., user financial information, user goals, user family information, etc.). As such, the systems, methods, and computer implementations disclosed herein improve current systems for determining the financial risk tolerance of a user for investment purposes by providing functionalities that are novel and non-obvious improvements over current systems.

Figure 1:
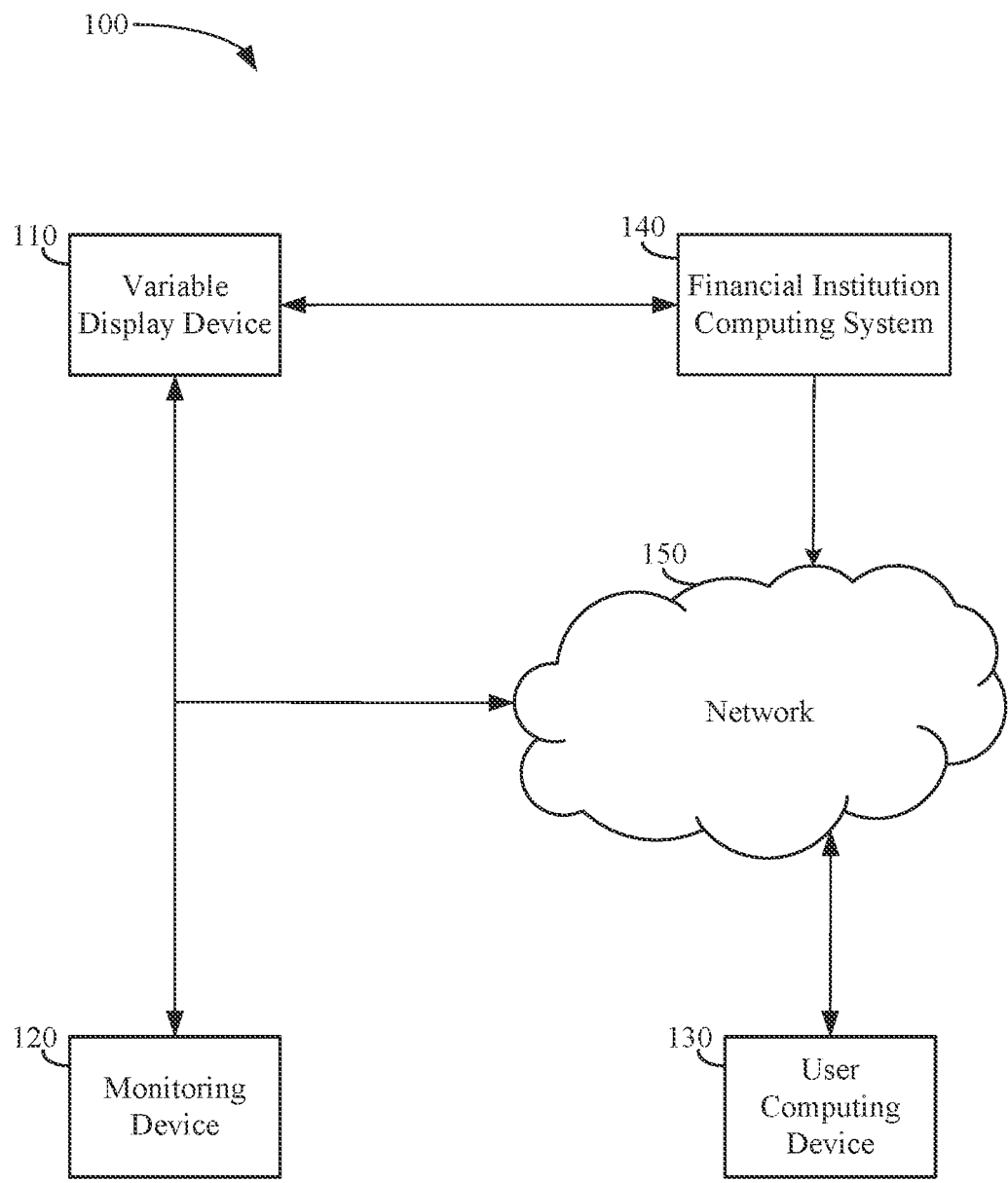
FIG. 1 is a block diagram of a system for measuring the risk response of a user to various projected financial outcomes, according to an example embodiment.

Referring to FIG. 1, a block diagram illustrating a financial risk tolerance measuring system 100 is shown according to an example embodiment. The financial risk tolerance measuring system 100 includes a variable display device 110, a monitoring device 120, a user computing device 130, and a financial institution computing system 140. Various components of the financial risk tolerance measuring system 100 may be configured to communicate with each other over a network 150. The network 150 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 150 includes the internet.

The variable display device 110 is a device configured to present a user with visual content. The visual content presented to the user may be based at least in part on at least one projected financial outcome of at least one potential investment plan for the user. The variable display device 110 may include any type of equipment capable of presenting a simulated virtual or augmented reality to the user, and may be configured to be worn by the user. The variable display device 110 can include a head-mounted display ("HMD") or the like. The variable display device 110 may be configured to receive content over the network 150 from the financial institution computing system 140 to present to the user. In some arrangements, the variable display device 110 can include a content database storing content to be presented to the user as well as content selection logic, stored in a system memory of the variable display device 110. The content selection logic is configured to select content stored in the database to be presented to the user.

In various arrangements, the variable display device 110 is configured to exchange information with the monitoring device 120, the user computing device 130, and the financial institution computing system 140 over the network 150. In some arrangements, the variable display device 110 is configured to receive results of statistical financial simulations from the financial institution computing system 140, and select virtual or augmented reality content to present to the user based on the results. In some arrangements, the variable display device 110 is configured to receive pre-selected content from the financial institution computing system 140 over the network 150 for presentation to the user. Additionally, the variable display device 110 may be configured to receive data from the monitoring device 120, and base the selected content on the received data. In some embodiments, the monitoring device 120 is included in the variable display device 110 and no additional monitoring devices 120 are used. In some embodiments, the variable display device 110 is incorporated into the financial institution computing system 140 and no additional variable display devices 110 are needed. In some embodiments, both the variable display device 110 and the monitoring device 120 are incorporated into the financial institution computing system 140, and only the financial institution computing system 140 executes the methods discussed herein.

The monitoring device 120 is a device configured to measure at least one user biometric response to the content displayed by the variable display device 110. The monitoring device 120 may include any type of equipment capable of acquiring information regarding the psychological and physical response of the user to the displayed content, such as location information, movement information, biometric information, a physiological characteristic of the user, and so on. The monitoring device 120 may include a computing device, a smartphone, a camera, a radar, a microphone, proximity sensors, inertial sensors, eye-tracking devices, a heart monitoring device, a thermometer, GPS sensors, gyroscopes, among other monitoring device types and sensors. In some embodiments, the monitoring device 120 is configured to be worn by the user. For example, the monitoring device 120 may be a smartwatch or include a clothing-embedded sensor. The monitoring device 120 is configured to exchange information with the user computing device 130 and the financial institution computing system 140. For example, the monitoring device 120 may be configured to transmit measured biometric response data over the network 150 to the financial institution computing system 140 for analysis. In some examples, the monitoring device 120 is included in or mounted on the variable display device 110, the user computing device 130, or the financial institution computing system 140.

The user computing device 130 is a computing system associated with the user. The user computing device 130 includes one or more processors and non-transitory storage mediums housing one or more logics configured to enable the user computing device 130 to exchange data over the network 150, execute software applications, access websites, generate graphical user interfaces, and perform other operations. Examples of the user computing device 130 include a personal computer such as a desktop or laptop computer, a smartphone, a tablet, a wearable computing device such as a smartwatch, and the like.

In some embodiments, the user computing device 130 is configured to manage a financial account of the user. For example, the user computing device 130 may include one or more circuits configured to provide the user with a financial planning interface on which the user can input various preferences pertaining to the financial future of the user, as will be discussed in more detail below with respect to FIG. 2. User computing device 130 is also configured to communicate information with other devices, such as the financial institution computing system 140 and the monitoring device 120. In some embodiments, the user computing device 130 is configured to transmit any inputted user preferences to the financial institution computing system 140 for use in a risk tolerance determination process that will be described in greater detail below.

The financial institution computing system 140 is a computing system at a financial institution capable of maintaining user accounts (e.g., payment card accounts) and databases of user information. The financial institution may include commercial or private banks, credit unions, investment brokerages, or the like. In some arrangements, the financial institution computing system 140 is configured to receive user financial goal and preference information from the user computing device 130 over the network 150. Additionally, responsive to a received user preference to initiate a risk tolerance determination process, the financial institution computing system 140 may be configured to retrieve user account information from a database and to run statistical simulations on projected outcomes of various user asset allocations. Based on those likely outcomes and the received user financial goal information, the financial institution computing system 140 may be further configured to selectively retrieve certain content from a content database and transmit that content to a variable display device 110 for viewing by the user. Additionally, the financial institution computing system 140 may be further configured to measure or receive measurement data obtained from a monitoring device 120 indicative of a user biometric response to the transmitted content and determine a user risk tolerance.

Figure 2:
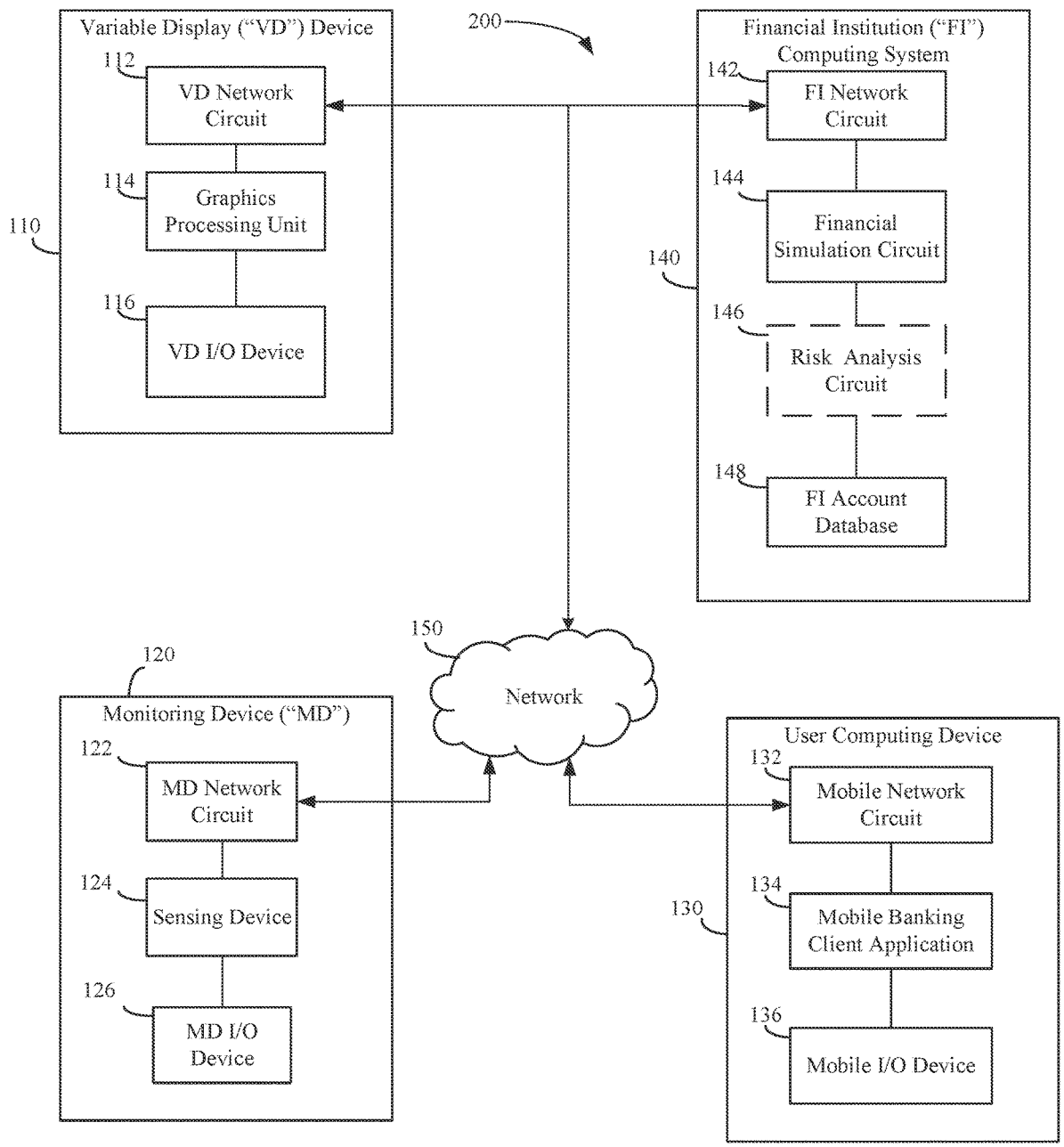
FIG. 2 is a more detailed view of the system displayed in FIG. 1, according to an example embodiment.

Referring to FIG. 2, a financial risk tolerance measuring system 200 is shown as a more detailed embodiment of the financial risk tolerance measuring system 100. The financial risk tolerance measurement system 200 includes example embodiments of the variable display device 110, the monitoring device 120, the user computing device 130, and the financial institution computing system 140 of FIG. 1.

In the financial risk tolerance measurement system 200, the variable display device 110 includes a variable display network circuit 112 enabling the variable display device 110 to exchange data over the network 150, a graphics processing unit (GPU) 114, and a variable display input/output (I/O) device 116. An input aspect of the variable display I/O device 116 allows an individual operating the variable display device 110 to provide information to the variable display device 110, and may include, for example, a mechanical keyboard, a touchscreen, a microphone, a camera, a fingerprint scanner, any user input device engageable to the variable display device 110 via a USB, serial cable, Ethernet cable, and so on. An output aspect of the variable display I/O device 116 allows an individual associated with the variable display device 110 to receive information from the variable display device 110, which may include, for example, display devices capable of displaying a virtual or augmented reality to the user such as a head-mounted display, or the like.

In some arrangements, the variable display device 110 includes devices not worn by the user, such as structure-mounted devices. For example the variable display I/O device 116 may include a single-color screen configured to be placed behind a user, a camera configured to capture imagery of the user and the single-color screen, and a digital display configured to be viewed by the user. The camera is configured to capture images of the user and the single-color screen. A memory (not shown) of the variable display device 110 has luminance keying instructions stored thereon, which cause the variable display device 110 to layer the images of the user captured by the camera onto other digital content. The other digital content may be received, for example, from the financial institution computing system 140. The luminance keying instructions configure the variable display device 110 to layer the captured of images of the user onto the digital content such that the images captured by the camera and the received images are superimposed on one another. The luminescence keying instructions may further configure the variable display device to make the color of the single-color screen transparent when the images are viewed on the digital display by the user such that the image of the user is overlaid onto a pre-configured background, thereby presenting the user with a representation of the user in a preconfigured environment. In some arrangements, as will be discussed in greater detail below, the content onto which the user image is projected is chosen based at least in part on the outcome of a statistical financial simulation such that the user is presented with how a financial future of the user may change based on an outcome of a certain investment plan.

In some arrangements, the variable display I/O device 116 may also include additional elements such as a digital display, a speaker, illuminating icons, LEDs, and so on. Further, the variable display I/O device 116 may be configured to include assemblies that serve both input and output functions, allowing the financial institution computing system 140, the monitoring device 120, and the user computing device 130 to exchange information with the monitoring device 120. Such assemblies include, for example, radio frequency transceivers (e.g., RF or NFC-based transceivers) and other short-range wireless transceivers (e.g., Bluetooth©, laser-based data transmitters, etc.).

The variable display device 110 further includes one or more graphics processing units 114. The graphics processing unit 114 is configured to create images stored in a portion of the memory (not shown) of the variable display device. In some embodiments, the graphics processing unit may manipulate portions of the content received from the financial institution computing system 140 to create a frame buffer so that content displayed to the user via the variable display I/O device 116 is constantly updated (e.g., to generate augmented reality video graphics).

The monitoring device 120 includes a monitoring device network circuit 122 enabling the monitoring device 120 to exchange data over the network 150, a sensing device 124, and a monitoring device I/O device 126. The monitoring device I/O device 126 allows an individual operating the monitoring device 120 to receive information from the monitoring device 120 and to input information to the monitoring device 120, in a similar capacity to the variable display I/O device 116 discussed above.

The monitoring device 120 may include a plurality of monitoring devices 120 configured to monitor a plurality of user responses to the content presented by the variable display device 110. The monitoring devices 120 may include any type of sensing device 124 used to acquire response information from a plurality of perspectives (e.g., psychological, physiological, etc.). For example, the sensing devices 124 may include an optical or infrared image sensor configured to capture digital video or still images of a face of the user as the user experiences the content displayed by the variable display device 110. Other circuitry (e.g., the risk analysis circuit 146 of the financial institution computing system 140) may analyze facial features of the user and compare the information contained therein with stored baseline information to determine the nature of the psychological response to the presented content. Additionally, the sensing devices 124 can include electrodermograph (EDG) or electrodermal (EDA) sensors configured to measure skin electrical and electrodermal activity using galvanic skin response (GSR), which may be used to determine whether the user is in a state of stress or anxiety, using similar comparison methodologies as discussed herein. Sensing devices 124 may include photoplethysmographic (PPG) sensors for measuring blood flow, heart rate, heart rate variability, and so forth. Sensing devices 124 may also include spectrometers or molecular sensors configured to detect changes in body chemistry or hormonal changes.

In some arrangements, the financial institution computing system 140 includes circuitry (e.g., the risk analysis circuit 146) configured to determine the extent of the user's stress or anxiety level while they are viewing the content displayed on the variable display device 110. In these arrangements, the monitoring device 120 is configured to transmit any user response data measured by the sensing device 124 over the network 150 to the financial institution computing system 140 for analysis using methods to be described in greater detail below.

In the risk tolerance measuring system 200, the user computing device 130 is a computing device associated with a user. The user computing device 130 has one or more processors and non-transitory storage mediums housing one or more logics configured to enable the user computing device 130 to exchange data over the network 150, execute software applications, access websites, generate graphical user interfaces, and perform other operations. The user computing device includes a mobile network circuit 132 enabling the user computing device 130 to exchange data over the network 150, a mobile banking client application 134, and a mobile I/O device 136. The mobile I/O device 136 includes hardware and associated logics configured to enable the user computing device 130 to exchange information with a user and a monitoring device 120, as well as the financial institution computing system 140 over the network 150 (e.g., through hardware similar to that discussed in relation to the variable display I/O device 116 discussed above).

The mobile banking client application 134 is a circuit configured to provide a user with the ability to engage in mobile banking. The mobile banking client application 134 may provide an interface configured to receive and display mobile web pages (e.g., web pages provided on the mobile I/O device 136 prompting the user to provide information to create an account, web pages displaying account balance information, past transactions, and so on) received from a financial institution computing system 140) over the network 150 via the mobile network circuit 132. The mobile banking client application 134 may be further configured to receive and display financial simulation results from the financial institution computing system 140.

In some arrangements, the mobile banking client application 134 is further configured to receive and display web pages that enable the user to input (e.g., via the mobile I/O device 136) financial advertising preferences and financial goal information, as will be discussed in greater detail below. In some arrangements, the mobile banking client application 134 may be a web based application. In some arrangements, to implement the mobile banking client application 134, the user may be logged on to a website operated by a computing system associated with the financial institution (e.g., the financial institution computing system 140).

In some arrangements, the mobile I/O device 136 includes sensory devices, such as those discussed above in relation to the monitoring device 120. These sensory devices may include, for example, optical or infrared image sensors, electrodermograph (EDG) or electrodermal (EDA) sensors, photoplethysmographic (PPG) sensors, spectrometers, or molecular sensors. Such sensors, for example, may be connected to the mobile I/O device 136 (e.g., via a USB port or the like) or may be integrated with the user computing device 130. In arrangements where the user computing device 130 includes additional sensory devices, the mobile network circuit 132 may be configured to receive a sensory information request over the network 150 (e.g., from the monitoring device 120, the variable display device 110, or the financial institution computing system 140) and in response to the received request, the mobile banking client application 134 may be configured to initiate a measurement sequence where user response data is obtained from the sensory devices. The mobile banking client application 134 can then transmit the measured data over the network 150 to the source of the information request.

The financial institution computing system 140 is a computing system associated with a financial institution configured to assess the risk tolerance of the user in order to assist the user in selecting an investment strategy. The user may or may not have financial accounts at the financial institution associated with the financial institution computing system 140. The financial institution computing system 140 includes one or more processors and non-transitory storage mediums housing one or more logics configured to enable the financial institution computing system 140 to exchange data over the network 150, execute software applications, access websites, generate graphical user interfaces, and perform other operations. The financial institution computing system 140 includes a financial institution ("FI") network circuit 142 enabling the financial institution computing system 140 to exchange data over the network 150, a financial simulation circuit 144, a risk analysis circuit 146, and a user account database 148.

The user account database 148 allows the financial institution computing system 140 to retrievably store user information relating to the various operations discussed herein, and may include non-transient data storage mediums (e.g., local disc or flash based hard drives, local network servers, and the like) or remote data storage (e.g., cloud servers). The user account database 148 includes personal user information (e.g., names, addresses, phone numbers, and so on), identification information (e.g., driver's license numbers, standard biometric data, and so on), and user financial information (e.g., token information, account numbers, account balances, available credit, credit history, transaction histories, and so on).

In some arrangements, the user financial account database 148 further includes user-input financial preferences, assets, and goals. In the case where the user does not have an account with the financial institution associated with the financial institution computing system 140, for example, the account database 148 may contain relatively little information about the user. To perform the methods discussed herein with respect to such a user, it may be preferred that the user input financial and other information. Accordingly, the user account database 148 may further include asset information that is manually input by the user. The manually entered asset information (input through, for example, the mobile I/O device 136) may include, for example total savings, investment holdings, liability information, and other assets (such as houses, cars, commodities, etc.). Furthermore, even in the case that the user does have an account with the financial institution associated with the financial institution computing system 140, additional information may be used to employ the methods discussed herein. For example, in embodiments where it is beneficial to present the user with virtual reality environments individually tailored to user financial objectives, it may be useful to have specific user preference information. Accordingly, the user financial account database 148 may have specific user preference information stored thereon. The user preference information may take the form of, for example, user responses to queries generated by the financial institution (e.g., presented to the user on the user computing device 130). Additionally, the user preference information may include information received or purchased from other entities, such as user search history information, user social media information, user travel history, and so on.

In some arrangements, the financial simulation circuit 144 includes a set of instructions stored in the memory of the financial institution computing system 140 configured to perform financial simulations. In some arrangements, the financial simulations use multi-variable statistical methods to project likely financial outcomes of certain investment plans. In some arrangements, Monte Carlo simulation methods are employed. Irrespective of the type of simulation used, the financial simulation circuit 144 is configured to receive user financial information as an input and generate a series of expected outcomes for a certain set of investment plans suitable for the user as an output. In some arrangements, the financial simulation circuit 144 retrieves the user information locally from the account database 148. In some arrangements, the financial simulation circuit 144 receives user input information over the network 150 from the user computing device 130. In some arrangements, the financial simulation circuit 144 is configured to generate a graphical interface including several queries prompting the user to input financial information, and to transmit the interface to the user computing device 130 over the network 150. Any user responses to the presented query are relayed by the FI network circuit 142 to the financial simulation circuit 144.

In some arrangements the financial simulation circuit 144 is configured to generate a set of recommended investment plans based on available information concerning the user. Each investment plan may include a different allocation of user financial assets. For example, a first portion of user financial assets may be allocated to be invested in high risk, high return instruments, such as stocks; a second portion of the user financial assets may be allocated for low risk investments, such as bonds; and a third portion may be set aside for various user living expenses. The various investment plans contained in the set of recommended plans alter the portion of the total user assets allocated for a particular purpose. The set of recommended investment plans may include various asset allocations having varying levels of risk. Once the set of recommended investment plans is formulated, the financial simulation circuit 144 simulates each recommended investment plan. The simulations generate a plurality of projected financial outcomes for each recommended investment plan. The simulations are based on various economic assumptions, such as assumptions regarding inflation, market returns, interest rates, and the inter-relationship of these and potentially other variables. The assumptions may or may not vary between each simulation. To illustrate, one simulation may assume strong financial returns, and assume that this is correlated with low interest rates; while another simulation may assume strong financial returns, but associate those returns with high interest rates. As assumptions vary, the financial simulation circuit 144 generates different financial outcomes based on historical risk, return, and asset correlation data over different time periods for each recommended investment plan.

In some arrangements, the simulation results generated by the financial simulation circuit 144 are configured to be transmitted (either through network 150 or other proprietary network associated with the financial institution) to the variable display device 110 to be used in selecting virtual or augmented reality content for display to the user (e.g., by the variable display I/O device 116).

The financial institution computing system 140 also includes a risk analysis circuit 146. The risk analysis circuit 146 performs one or more of analyzing simulations produced by the financial simulation circuit, selecting and delivering particularized content to the user based on the simulations, receiving sensor information indicative of the biometric response of the user to the delivered content, and assess a risk tolerance of the user. An example of the risk analysis circuit 146 is set forth with respect to FIG. 3.

In some examples, the risk analysis circuit 146 may be implemented within a processor (not shown) of the financial institution computing system 140. For example, the risk analysis circuit 146 may be implemented as a software application stored within a memory (not shown) of the financial institution computing system 140 and executed by the processor. Accordingly, such examples can be implemented with minimal additional hardware costs. However, some examples include apparatuses and methods implemented with dedicated hardware specifically configured for performing operations described herein with respect to the risk analysis circuit 146. For example, the risk analysis circuit 146 may be implemented with a processing component separate from the processor of the financial institution computing system 140. In other arrangements, the risk analysis circuit 146 may be implemented within the financial simulation circuit 144, or vice versa.

Figure 3:
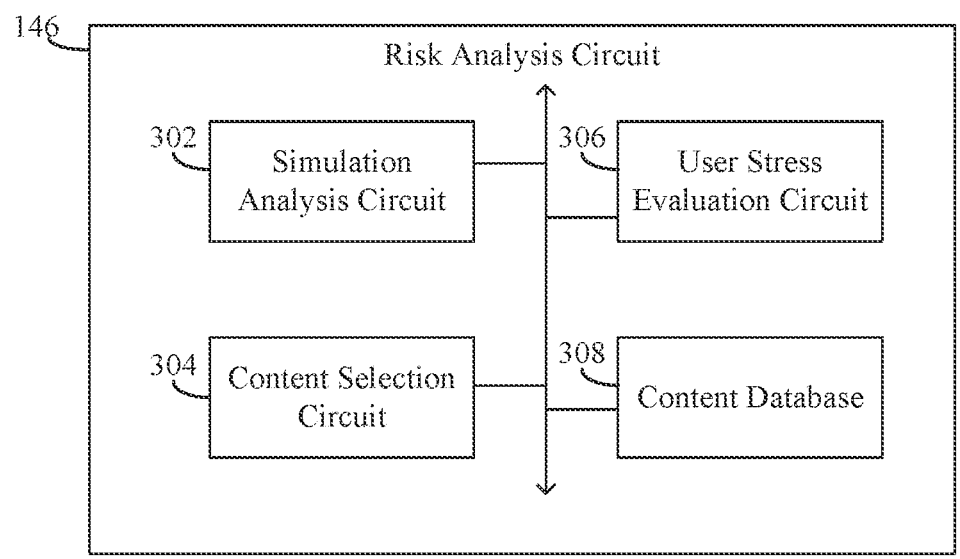
FIG. 3 is a depiction of a risk analysis circuit of the system shown in FIG. 2, according to an example embodiment.

Referring now to FIG. 3, the functions and structures of the risk analysis circuit 146 of the financial institution computing system 140 are shown in greater detail according to example arrangements. Referring to FIGS. 2-3, while the functions and structures of the risk analysis circuit 146 are described with reference to the financial institution computing system 140, one of ordinary skill in the art can appreciate that one or more functions may be implemented within other devices. For example, with respect to functionalities regarding the selection and storage of digital content discussed below, these logics may be implemented in a separate computing system, such as within the variable display device 110. Additionally the functionality of determining the user response to the displayed content using the biometric data may be performed by logics within a computing system associated with the monitoring device 120.

In some arrangements, the risk analysis circuit 146 includes one or more of simulation analysis circuit 302, content selection circuit 304, user stress evaluation circuit 306, and a content database 308. In some examples, one or more of the simulation analysis circuit 302, content selection circuit 304, and user stress evaluation circuit 306 are implemented as a software application stored within the memory of the financial institution computing system 140 and executed by the processor. In some examples, the content database 308 is a suitable storage or database included in the memory. In other examples, one or more of the simulation analysis circuit 302, content selection circuit 304, user stress evaluation circuit 306, and the content database 308 are implemented with dedicated hardware specifically configured for performing operations described herein with respect to each component.

The simulation analysis circuit 302 is configured to connect financial simulation results generated by the financial simulation circuit 144 to user information indicative of user goals. Accordingly, the simulation analysis circuit 302 is communicatively coupled to the financial simulation circuit 144, the account database 148, and the network circuit 142. In some arrangements, the simulation analysis circuit 302 is configured to identify user goals. User goals may be determined based on user preferences received from the user computing device 130 over the network 150 via the FI network circuit 142. For example the risk analysis circuit 146, may be configured to transmit various prompts to the user that instruct the user to input various financial preferences and life preferences. In turn, the user inputs information indicative of user goals into the user computing device 130 which transmits the user preference information to the financial institution computing system 140. Information indicative of user goals can include information regarding, for example, future financial goals (e.g., target asset values, retirement savings, and the like), living preferences (e.g., living arrangement preferences, traveling goals, child education, retirement), and the like. In some arrangements, the simulation analysis circuit 302 is configured to receive the information input by the user (e.g., by the FI network circuit 142) and identify user goals. In some arrangements, the simulation analysis circuit 302 is also configured to associate identified user goals with an expected financial cost. For example, if the user indicates traveling to a particular destination as a user goal, the simulation analysis circuit 302 may be configured to project the cost of traveling to that destination at various times (e.g., in one year, ten years, twenty years, etc.).

In some arrangements, the simulation analysis circuit 302 is configured to generate user goals based on information stored locally in the FI account database 148, such as user biographical information, user account balance information, credit history, and the like. For example, using locally stored information, the simulation analysis circuit 302 may generate a set of likely user goals. Likely user goals may include, for example, financial goals of other users associated with the financial institution that have comparable information (e.g., similar wealth, age, family situation, etc.) to the user.

In some arrangements, after user goals are identified, the simulation analysis circuit 302 may be further configured to determine if the user will be able to accomplish the user goals based on the simulation results generated by the financial simulation circuit. For example, the simulation results generated by the financial simulation circuit 144 may include a plurality of projected user asset values at various time frames. The simulation analysis circuit 302 may allocate portions of the projected asset values to user goals. In some arrangements, the simulation analysis circuit may use baseline asset allocations stored in the memory of the financial institution computing system 140 to allocate the projected user asset values to various user goals. The baseline allocations may include data indicating what similarly situated users (e.g., in terms of asset value) spend on related user goals. Thus, by using the baseline asset allocations, the simulation analysis circuit 302 may produce a projected amount of money that the user will be able to spend on a particular user goal. In some arrangements, the simulation analysis circuit 302 is further configured to compare the projected amount of money to a projected cost of the user life goal to determine if the user will be able to accomplish the user goal.

In some arrangements, only a portion of the generated financial simulations results produced by the financial simulation circuit 144 are analyzed by the simulation analysis circuit 302. The simulation analysis circuit 302, for example, may be configured to sample (e.g., select a representative subset) the simulation results. For example, the simulation analysis circuit 302 may be configured to select a predetermined subset of the simulation results. The predetermined subset may include the most common financial result (e.g., in terms of asset value) for a particular investment plan, as well as a set of successful financial outcomes and a set of unsuccessful outcomes. The number of each of the outcomes included may depend on their relative commonality amongst the entirety of the financial simulation results achieved. Accordingly, if successful outcomes are more common in the received simulation results, more successful outcomes will be sampled than unsuccessful ones. For each of the selected simulation results, the simulation analysis circuit 302 may generate a projected amount that the user has to put towards a user goal at a particular time.

The content selection circuit 304 selects content to be presented to the user. In some arrangements, the content selection circuit 304 selects content configured to present a plurality of depictions to the user based on the information generated by the simulation analysis circuit 302. For example, if the simulation analysis circuit 302 determines a projected amount that the user will be able to allocate towards a particular user goal, the content selection circuit 304 is configured to search the content stored in the content database 308 and determine whether any of the content stored thereon is applicable to the user goal and the projected amount. To illustrate, if a user indicates that they have a preference to travel to a particular designation with a particular frequency, a projected traveling cost is generated by the simulation analysis circuit 302. Additionally, the simulation analysis circuit 302 may determine that, according to a particular simulation of an investment plan, the user will not be able to afford the projected traveling cost at a later date. Accordingly, the content selection circuit 304 is configured to retrieve content stored in the content database 308 that is consistent with the user not being able to afford traveling to the indicated destination. Retrieved content may be configured to depict the user traveling to a relatively less expensive travel destination at a lower frequency.

If, however, the simulation analysis circuit 302 comes to a different result (e.g., that the user will be able to afford the projected traveling cost), the content selection circuit 304 may be configured to retrieve any content stored in the content database 308 corresponding to the indicated destination (e.g., depictions of the user traveling to the indicated destination). If no such content is stored in the content database 308, the content selection logic 304 may be configured to content depicting similar user preferences (e.g., travel destinations having a similar cost to the preferred travel destination).

In some arrangements, the content selection circuit 304 is configured to retrieve the content stored in the content database 308 in a particular sequence. For example, the simulation analysis circuit 302 may provide a plurality of projected amounts that the user may put towards various user goals. Responsive to the projected amounts, the content selection circuit 304 may be configured to retrieve content from the content database 308 configured to present multiple depictions to the user. Each depiction may be related to a particular user goal, and may be presented to the user in a particular order. To illustrate, if the simulation analysis circuit 302 projects that a particular middle-aged user having a teenaged child will have more than enough money to achieve various user goals, the content selection circuit 304 may be configured to retrieve content that contains a depiction of the user traveling to a particularly expensive travel destination, another depiction of the user attending a graduation ceremony for the child at a prestigious university, and another depiction of the user retiring in a nice home. By presenting multiple depictions signifying financial success to the user, the risk tolerance measuring system 200 can gain a more reliable measurement of the user biometric response to financial success than if only a single depiction signifying financial success were presented. In some circumstances, the accomplishment of certain financial goals may actually induce a user biometric response that is similar to a biometric response to not accomplishing another financial goal (e.g., a high level of user stress or anxiety). The middle-aged user discussed above, for example, may have reacted to the depiction of the graduation ceremony with a certain level of stress, and so the comparative value of the biometric response data associated with that depiction may be limited because the middle-aged user may react similarly to depictions meant to signify financial failure (e.g., a depiction of the user attending a graduation ceremony at a community college). Depicting multiple aspects of financial success, however, provides the risk tolerance measuring system 200 with multiple datasets that can be compared with one another to generate a normalized user response to financial success.

In some arrangements, the content selection circuit 304 is also configured to transmit any selected content to a variable display device 110 for viewing by the user while the user is monitored by the monitoring devices 120. In arrangements where the variable display device 110 is not included in the financial institution computing system 140, the content selection circuit 304 communicates retrieved content to the FI network circuit 142, which in turn transmits the content over the network 150 to the variable display device 110. In some arrangements where the variable display device 110 is associated with the financial institution computing system 140, the content selection circuit 304 is configured to relay selected content locally to any variable display device (e.g., by variable display I/O device 116).

The user stress evaluation circuit 306 is configured to determine a user tolerance of the risks associated with a particular investment plan. For example, for each investment plan selected for the user, the financial simulation circuit 144 may be configured to generate a plurality of potential outcomes, and the simulation analysis circuit 302 may be configured to select a representative sample of potential outcomes, and tie each sampled outcome to at least one user goal. The user may be presented with a plurality of depictions generated from the content selected by the content selection circuit 304 from the content database 308. Each depiction may be selected based on a sampled simulation outcome. Thus, in some arrangements, the monitoring devices 120 capture a plurality of sets of sensing data, with each set corresponding to a particular depiction presented to the user. The risk analysis circuit 146, through the user stress evaluation circuit 306 may be configured to generate a relative user stress level for each depiction presented to the user.

In some arrangements, user stress evaluation circuit 306 is configured to receive the user response information measured by sensing devices 124 of the monitoring devices 120 as the user watches the content delivered by the content selection circuit 304 to the variable display device 110 over the network 150 via the FI network circuit 142. The user stress evaluation circuit 306 may be configured to preform operations on received sensor data to assess the level of user stress or anxiety that the digital content selected by the content selection circuit 304 induced in the user. In some arrangements, the user stress evaluation circuit 306 compares the received user sensor to a set of baseline sensor readings associated with the user and stored in the account database 148. The baseline sensor readings may include sensor data of the user measured while the user is presented with a preselected set of baseline content. The baseline content may include content presented to the user via the variable display device 110 selected by the financial institution to induce a particular response to the user. For example, the baseline content may include a scenario meant to induce little to no stress in the user, and a scenario meant to induce a higher level of stress in the user. Thus, the baseline sensor readings may include a user low stress set of sensor data and a user high stress set of data. The user stress evaluation circuit 306 may be configured to compare any received sensor data from the monitoring device 120 to these baseline readings to determine the user stress or anxiety levels.

In some arrangements, the user stress evaluation circuit 306 is configured to receive the raw sensor data measured by the monitoring device 120. The formats of the data collected from various sensing devices 124 included in the monitoring device 120 may vary depending on the type of sensing device 124 that detected a particular dataset. For example, certain datasets received from the monitoring devices 120 may include a set of photographs of the face of the user, while other datasets may measure heartrate or temperature. In some arrangements, each sensing device 124 may capture multiple measures of the user as the user watches each depiction selected by the content selection circuit 304. The user stress evaluation circuit 306 may be configured to average values or select a single sensor value (e.g., maximum minimum, mode, etc.) from the datasets, or determine the range of the sensor values. The user stress evaluation circuit 306 may be further configured to normalize the sensor data so that the data collected in the various formats can be combined to produce an overall user stress score to associate with the depiction presented to the user while the sensor data was captured. The overall user stress score may be produced by performing various operations on the normalized sensor data. The sensor data may, for example, be averaged, summed, or the like. In other arrangements, the variability (e.g., range) of the sensor data may be assessed by the user stress evaluation circuit 306.

In some arrangements, the user stress evaluation circuit 306 is further configured to recommend an investment plan to the user based on the received user response data. In some arrangements, user stress evaluation circuit 306 weighs a variety of factors pertaining to a particular investment plan to produce an overall score for each investment plan. The various factors may include the biometric response of the user to the content associated with the investment plan, the expected returns of the investment plan, and implementation costs of the investment plan. For example, if the user response data indicates that the user had high stress levels when viewing the content selected by the content selection logic 304 pertaining to a particular investment plan, this would reflect negatively on the overall score of an investment plan. On the other hand, a high average return of the investment plan would reflect positively on the plan. Accordingly, both of these factors, as well as others, may be weighed against each other to determine an overall score. The relative weights given to any factor may be selected based on user preference information stored in the account database 148. For example, if the user indicated that they prefer lower-risk returns, then high user stress scores or response variability across the series of projected outcomes will be weighed more heavily than higher expected returns. Once all of the user response data is received, and each preferred investment plan scored user stress evaluation circuit 306 is configured to select the highest scoring investment plan and to notify the user of the selection.

In some arrangements, the user stress evaluation circuit 306 is configured to generate a user risk score for each preferred financial plan, as well as an expected financial return, and present this information to the user by, for example, transmitting a graphical interface for viewing via the user computing device 130.

The content database 308 stores digital content to be transmitted to the user for viewing via the variable display device 110. The information stored thereon includes, for example, a series of sets of image data designed to present various depictions of financial outcomes to the user. The depictions may present various environments from various vantage points to the user. In some arrangements, the depictions of various environments are configured to present the user with a virtual or augmented reality. In some arrangements, the various environments are pre-selected by the financial institution to relate to various sets of common user goals, such as traveling, retirement, home ownership, charitable donations, and the like. The image sets meant to depict the various environments stored in the content database 308 may include images of various styles of homes, travel destinations, depictions of charitable events, depictions of parenting events (e.g., graduations, colleges, and the like), personal property, and the like. In some arrangements, the content database 308 stores many different environments pertaining to user goals. The data stored in the content database is meant to include some events that users will associate with financial success, and other events that the users will associate with financial failure. In some arrangements, the content database includes a variety of simulated environments pertaining to each user goal, with each of the simulated environments corresponding to a different amount of financial success. Content relating to any preference indicated by users may be stored in the content database. Any depiction capable of inducing a physical reaction in the user may be used in accordance with the methods discussed herein.

Figure 4:
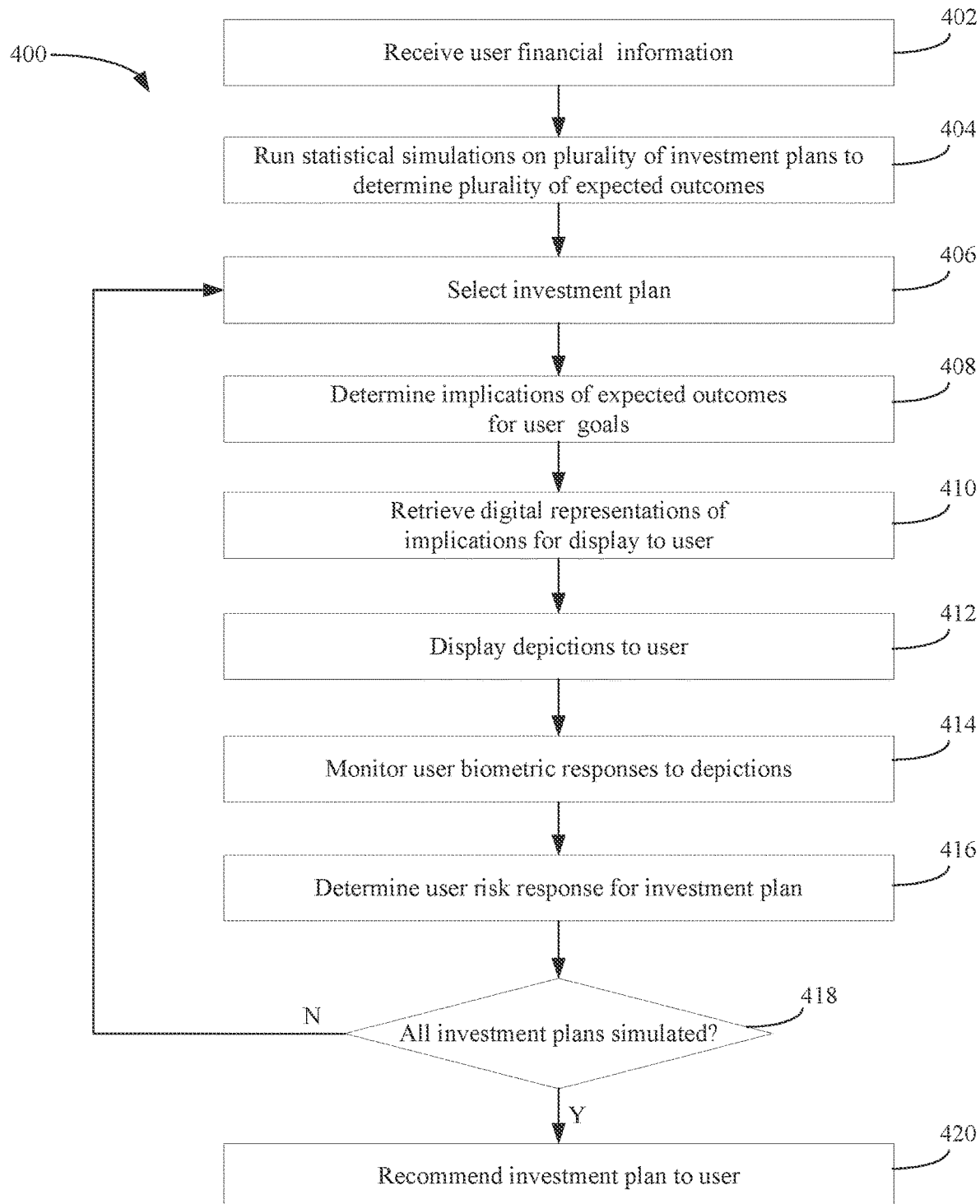
FIG. 4 is a flow diagram of a method for measuring the risk tolerance of the user to projected financial outcomes of at least one investment plan, according to an example embodiment.

Referring now to FIG. 4, a method 400 is shown for measuring user risk tolerance by measuring user responses to depictions of financial outcomes according to an example embodiment. The method 400 may be performed, for example, by processing and storage hardware on the financial institution computing system 140. In some arrangements, certain steps of the method 400 are performed by the financial institution (e.g., by the financial simulation circuit 144 and the risk analysis circuit 146), while others are performed by the variable display device, while still others are performed by the monitoring device 120 (e.g., by the sensing device 124).

At 402, user financial information is received. The user financial information is received by a FI financial simulation circuit (e.g., the financial simulation circuit 144). In some arrangements, the information is received locally from a database (e.g., the account database 148) associated with the financial institution computing system 140. In some arrangements, the user financial information is received over a network (e.g., the network 150), via a network circuit (e.g., the FI network circuit 142) from a computing device (e.g., the variable display device 110, the monitoring device 120, or the user computing device 130). In some arrangements, the user financial information is input by the user into graphical interface displayed by an I/O device (e.g., the variable display I/O device 116, the monitoring device I/O device 126, or the mobile I/O device 136), and then transmitted to the I/O device from the financial institution computing system 140.

In various arrangements, the received user information includes user identifying information, user financial information, and user life preference information. The user identifying information identifies the user and may include, for example, a user name, date of birth, and the like. The user financial information informs the financial institution about the current financial situation of the user. User financial information may include, for example, financial account identifying information, user account information (e.g., balances, credit histories, and the like), user financial asset information (total net worth, investment assets, living assets, and the like). User life information informs the financial institution about the life of the user. User life information may include for example, biographical information including, dependents, spousal information, health information, employment information, education information, and the like. User life information may also include user preference information. The user life information may include, for example, user life goal information, which may pertain to preferences regarding home ownership, traveling goals, children education, user charitable goals, user hobbies, and the like. The user life information may also include user financial preferences, including for example, user spending habits, savings goals, investment goals, and the like.

At 404, the information received is used to run statistical simulations. The simulations are run by a simulation circuit (e.g., the financial simulation circuit 144) that retrieves the received user financial information. In some arrangements, the simulation circuit uses the received user financial information to generate a set of preferred investment plans, with each investment plan including a different investment asset allocation (e.g., a high risk allocation, and a low risk allocation) for the user. The set of preferred investment plans may be determined based on the user financial asset information and user life event information received at 402. The simulation circuit, for example, may be configured to retrieve a set of investment plans (e.g., from the account database 148) used in the past by other users having similar financial information to the current user. In other arrangements, the set of investment plans to test may be manually input by authorized personnel at the financial institution via an input/output device (not shown) associated with the financial institution computing system 140.

After the set of preferred investment plans is generated, the simulation circuit runs a series of multi-variable statistical simulations for each of the investment plans. Each simulation makes a different set of assumptions regarding various variables (e.g., capital market returns, international events, inflation, and the like) and the interrelationship among those variables. These different assumptions produce a series of different financial outcomes for the user (e.g., in terms of the total net worth of the user over varying time periods).

At 406, a set of simulation results relating to a particular preferred investment plan is selected. In one arrangement, a risk analysis circuit (e.g., the risk analysis circuit 146 via the simulation analysis circuit 302) selects a particular set of simulation results. The set of simulations may not include all of the simulation results pertaining to the preferred investment plan produced by the simulation circuit, but may include a subset of the simulation results. The subset may be selected using a sampling technique, where a simulation result is selected at predetermined intervals (e.g., every tenth simulation result may be selected). The subset may be selected by making statistical measurements of the total set of simulation results produced by the simulation circuit. For example, if each simulation result produces a projected asset value for the user, the simulations may be divided into groups based on the projected asset value. To illustrate, financial simulation results projecting total asset values between $100,000 and $200,000 in five years may be grouped together. The risk analysis circuit 146 may then be configured to select a number of simulation results from each group. To illustrate, if the financial simulation circuit 144 produces one hundred projections for a particular investment plan, the simulation analysis circuit 302 may be configured to select ten of those projections from various groups. The number of projections selected from a particular group may be based on the percentage of the total projections that fall into that group. If twenty out of the one hundred projections fall within the $100,000 to $200,000 group discussed above, for example, then two out of the ten selected projections may be taken from that group.

At 408, the selected set of simulation results are translated into a plurality of user financial implications for user goals. In some arrangements, a circuit (e.g., the risk analysis circuit 146 via the simulation analysis circuit 302) analyses the user preference information received at 402 to determine at least one user goal and an implication of a simulation result for the user goal. For example, if the user preference information reveals that the user has a preference to purchase a new home within a particular price range in five years' time, the circuit is configured to determine whether a particular simulation result is compatible with that preference. For example, traditional financial advising guidelines may be used as parameters to determine a value of a home that the user may afford at the projected net worth of the user based on the simulation result, and whether the value of the home is compatible with the user preference. This sequence may be repeated for other simulation results associated with the same preferred investment plans and other user goals so as to generate a series of financial implications associated with that preferred investment plan.

In some arrangements, where the received user preference information does not contain enough information to generate an implication for a user goal, the circuit may be configured to generate a default implication. The default implications may, for example, be determined using history information (stored, for example, in the account database 148) associated with a plurality of other users of the financial institution. For example, using any user financial and biographical information received at 402, the circuit may be configured to determine the historical impact that certain investment outcomes (e.g., certain percentage declines in net worth or investment asset value) had on similarly situated users.

In some arrangements, the circuit may be configured to identify an impact of the financial simulation results on a particular preference indicated by the user. For example, through an information gathering process, an interface containing queries may be presented to the user by the user computing device 130. On the interface, the user may have indicated a top priority financial goal that takes precedence over all other user preference information. In this example, the circuit (e.g., the risk analysis circuit 146) is configured to determine a particular financial outcome pertaining to that most important financial goal. The circuit may, for example, utilize other user preference information to determine the financial impact on the top priority goal. The other user preference information, for example, may include amounts that the user spends on core living expenses (e.g., food, lodging, transportation, healthcare, etc.), and savings preferences (e.g., a minimal amount which the user wishes to have in savings at all times). Thus, the circuit may be configured to deduct mandatory amounts from any projected returns on investments or total net worth of the user, and allocate any remaining value to the top priority goal, in determining the implications of a similar result for the user.

At 410, based on the implications that financial simulation results have on the user goals, content is selected for presentation to the user. In some arrangements, a content selection circuit (e.g., the risk analysis circuit 146 via the content selection circuit 304) selects content to be delivered to the user. The content selection circuit selects, based on the implications determined at 408, digital content stored in a database (e.g., the content database 308) to be displayed to the user. The selected digital content may present the user with a series of depictions of financial outcomes projected by the selected simulation results. The depictions may include a series of digital environments to be presented to the user, with each digital environment depicting a financial implication generated for the user at 408. The content may be selected based on both a topic that the user life goal pertains to (e.g., housing, travel, etc.) as well as an simulated amounts that the user may have available to allocate towards that life goal. To provide an illustrative example, if the user indicated a wish to purchase a home worth over $500,000 in five years, but a financial simulation projects that the user (e.g., due to poor market returns) may only be able to afford a $200,000 home in five years, the content selection circuit may select depictions of homes that are projected to be worth $200,000 in five years to be presented to the user. However, if another financial simulation projects that the user, due good market returns, for example, may only be able to afford a $700,000 home in five years, the content selection engine may select depictions of homes that are projected to be worth $700,000 in five years to be presented to the user.

In various arrangements, the correlation between the selected content and the user goal will depend on a multitude of factors, among them being the amount of content stored in the database (e.g., the content database 308), the specificity of the indicated user preference information, and the like. In some arrangements, if the content selection circuit is unable to locate any content stored in the content database that corresponds to a particular user goal, the content selection engine may be configured to further assess the received at 402 for other user goals until a match in the content database is located. In other arrangements, if no matches are found, then the content selection circuit may be configured to conduct a broader search for content. For example, if the user indicates a desire to travel to a particular country in the next three or four years, but there is no corresponding content (e.g., depicting an environment located in that country) stored in the database, then the content selection circuit may be configured to search for comparable countries (e.g., countries located in the same continent, or countries where people historically visit as well as the designated country).

At 412, depictions of financial simulation outcomes are displayed to the user. In some arrangements, content selected from the content database (e.g., content database 308) is transmitted via the FI network circuit 142 over the network 150 and received by the variable display device 110. The content is processed by a graphics processing unit (e.g., the graphics processing unit 114) and displayed to the user via an I/O device (e.g., the variable display I/O device 116). The form of the content delivered will vary depending on the arrangement of the I/O device. For example, in arrangements where the I/O device includes a head-mounted display including motion sensing devices, the delivered content may include images captured from a variety of field of views. The field of view presented to the user may vary depending on the relative motion of the head-mounted display with respect to various reference points, so as to give the user three hundred and sixty degree viewpoints of an environment. In some arrangements, in the case where the I/O device includes a camera and single-color screen, for example, the content delivered may consist of two dimensional image data of a preconfigured environment, which is layered onto image data of the user within the single-color screen. In these arrangements, the graphics processing unit may be configured to render image pixels including the color of the single-color frame transparent, so that the layered images presented to the user show a third-person view of the user in a pre-selected environment.

At 414, as the selected depictions are displayed to the user, the biometric response of the user is measured. In some embodiments, the biometric response of the user is measured by at least one monitoring device (e.g., the monitoring device 120) that includes at least one sensing device (e.g., sensing devices 124) that measure various aspects of user reactions to the displayed content. The biometric response gathered may include information relating to user facial expressions, and other physical user responses (e.g., perspiration, eye-movements, pupil dilation, tears, heartbeat, hormonal responses, and the like) related to user perception of the generated content. When the user responses to depictions of a series of financial implications associated with a particular preferred investment plan have been collected, this information may then be transmitted by a network circuit (e.g., the monitoring device network circuit 122) over a network (e.g., the network 150) to the financial institution computing system 140 for processing.

In some arrangements, in addition to or instead of the biometric response of the user being measured, user-input reaction information is also received. For example, as the selected depictions are displayed to the user on the variable display device 110, the monitoring device may present the user (e.g., via a digital display of the monitoring device I/O device 126) with an interface that provides the user the ability to indicate a level of discomfort or emotion induced by the selected depiction. The interface may include a plurality of selectable discomfort levels or emotions. For example, in some embodiments, the user is able to indicate their response to the simulated depiction by selecting an icon from among a plurality of icons representing possible responses to the simulation depiction. Each icon may represent a different emotion (e.g., satisfaction, dissatisfaction, anxiousness, etc.). Responsive to the user selecting a particular emotion or discomfort level after viewing a depiction, the monitoring device may be configured to package the selected discomfort level with the biometric response data measured while the user watches the depiction. This way, the financial institution computing system 140 receives both objective and subjective measures of the user's response to the selected depictions.

At 416, a user risk response to displayed depictions investment plan is determined. In some arrangements, a risk analysis circuit (e.g., the risk analysis circuit 146 via the user stress evaluation circuit 306) determines the user risk response once it has received the user response data over the network 150. The risk analysis circuit may be configured to combine all of the user response information collected with respect to a particular investment plan in a meaningful way so that the user's aggregate reaction to potential financial implications of that investment plan can be considered. In selecting an investment plan for the user, the user's response to a particular poor financial outcome in one simulation may matter less than the user's total reaction to a series of projected financial outcomes. Thus, in some arrangements, the response determination circuit is configured to generate a user risk score for the particular investment plan. The risk score may take on a plurality of forms. In one arrangement, for example, the risk analysis circuit is configured to determine a user stress score for each depiction presented to the user. The user stress score may be based on the totality of user response information gathered for each depiction (e.g., from the variety of sensing devices 124) in accordance with a predetermined formula including preconfigured inputs to generate such a score for each depiction. Alternatively, the risk analysis circuit may generate a user risk score by comparing the received user response data to baseline user response data stored in the account database 148. After a score is obtained for all of the depictions associated with a particular investment plan, the scores may then be combined (e.g., averaged or compared a baseline set of scores) or analyzed to generate an aggregate user score for that particular investment plan.

In some arrangements, the risk analysis circuit may be configured assess the user risk response to an investment plan based not on any particular sets of user response data, but on the aggregate of all user response data obtained in relation to that investment plan. For instance, in the steps above, a series of depictions are presented to the user, with each being associated with a different financial implication associated with a result of a financial simulation of a certain investment plan. A set of user response information is generated for each of these depictions. Thus, a series of sets of user response information is generated for each analyzed investment plan. The risk analysis circuit may perform certain operations on the plurality of sets of user response data to generate a risk score for a particular investment plan. The operations may include, for example, averaging the user response information over the series of datasets to create an average user response. Alternatively, the user responses may be totaled and compared to a baseline total response set. The baseline total response set can include an average user response data set to an investment plan that the average user finds to be satisfactory.

In some arrangements, the risk analysis circuit is configured to assess the variability of the user responses associated with a particular investment plan. For example, potential financial implications of various projected outcomes of an investment plan may include successful outcomes and unsuccessful outcomes to varying degrees. In assessing the user's risk tolerance, the difference between a response of the user to a successful situation and a response of the user to an unsuccessful situation may be the most important. Accordingly, the risk analysis circuit may be configured to compare user response data associated with various situations. Such a comparison may include, for example, determining the standard deviation of the user response data so that a high standard of deviation (e.g., indicating a high variability of user response) is associated with a low risk tolerance. The risk analysis circuit may also categorize received user response datasets by whether they met user preferences (e.g., the projected financial outcome enabled the user to achieve a user goal or the projected financial outcome did not enable the user to achieve a user goal) and compare data combinations (e.g. averages, sums, or the like) amongst categorized datasets to determine a variability score. Other alternatives for determining a variability score are envisioned.

At 418, the financial institution computing system 140, having determined the user response to a particular investment plan, is configured to determine whether a such a profile has been generated for all of the preferred investment plans generated at 404. If a risk profile has not been generated for all identified investment plans, then a risk analysis circuit (e.g., risk analysis circuit 146) is configured to revert back to 406, and retrieve another set of financial simulation results associated with another investment plan to repeat steps 408-416 to generate a score for those investment plans.

At 420, an investment plan is recommended to the user. In some arrangements, a circuit of the financial institution computing system 140 (e.g., the risk analysis circuit 146 via the user stress evaluation circuit 306) is configured to generate a graphical interface representing an investment plan, and transmit the interface through a network circuit (e.g., the FI network circuit 142) over a network (e.g. the network 150) for display to the user via an I/O device (e.g., variable display I/O device 116, monitoring device I/O device 138, or mobile I/O device 136). In various arrangements, once an aggregate user risk response (e.g., a user stress score) has been obtained for all identified investment plans, a recommended investment plan is determined based at least in part on the aggregate user risk response. In some arrangements, the recommendation is made by picking a top overall scoring investment plan. The top overall score is based at least in part on the user risk score generated for each of the investment plans at 416. Additional factors that may be taken into account are expected returns of an investment plan, tax implications, total expense to the user, and the like.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A computing system comprising:
  a risk analysis circuit configured to:
    simulate a plurality of investment outcomes;
    display at least one augmented reality or virtual reality depiction of at least one of the plurality of investment outcomes via a display device;
    monitor a reaction of a user to the displayed at least one augmented reality or virtual reality depiction, wherein monitoring the reaction includes measuring a biometric response of the user;
    generate a user reaction score by comparing the biometric response with a biometric response baseline; and
    generate an overall score for each of the plurality of investment outcomes by weighing the user reaction score and investment outcome.

2. The computing system of claim 1, wherein monitoring the reaction includes receiving, from the user via the display device, an indication of a level of emotion induced by the displayed at least one augmented reality or virtual reality depiction, and wherein the user reaction score is generated by comparing the level of emotion to a baseline level of emotion.

3. The computing system of claim 1, wherein the risk analysis circuit is further configured to receive user information.

4. The computing system of claim 3, further comprising an account database storing financial information for a plurality of users and a network circuit enabling the computing system to exchange information over a network, wherein at least a portion of the received user information is retrieved from the account database.

5. The computing system of claim 4, wherein the received user information includes information received, over the network via the network circuit, from a computing device associated with the user indicating at least one user goal.

6. The computing system of claim 5, further comprising a content database storing digital content, wherein displaying at least one augmented reality or virtual reality depiction of at least one of the plurality of investment outcomes includes:
  retrieving digital content from the content database based on a characteristic of at least one of the plurality of investment outcomes; and
  transmitting the retrieved digital content to the display device.

7. The computing system of claim 6, wherein the characteristic includes a projected monetary amount allocated toward the at least one user goal.

8. The computing system of claim 7, wherein the digital content stored in the content database includes a plurality of digital environments associated with at least one financial or non-financial goal of the plurality of users.

9. The computing system of claim 1, further comprising a monitoring device that includes at least one of the following: an infrared image sensor, an optical image sensor, an electrodermograph, a photoplethysmographic sensor, or a spectrometer.

10. The computing system of claim 1, wherein the display device comprises at least one sensing device and a graphical processing unit, the at least one sensing device configured to capture at least one aspect of surroundings of the display device, the graphical processing unit configured to incorporate the at least one aspect of the surroundings of the display device into the displayed at least one augmented reality or virtual reality depiction.

11. A method of determining an investment risk tolerance of a user comprising:
  simulating, by one or more processing circuits, a plurality of investment outcomes;
  displaying, by the one or more processing circuits, at least one augmented reality or virtual reality depiction of at least one of the plurality of investment outcomes to the user;
  monitoring, by the one or more processing circuits, a reaction of the user to the displayed at least one augmented reality or virtual reality depiction, wherein monitoring the reaction includes measuring, by the one or more processing circuits, a biometric response of the user;
  generating, by the one or more processing circuits, a user reaction score by comparing the biometric response with a biometric response baseline; and
  generating, by the one or more processing circuits, an overall score for each of the plurality of investment outcomes by weighing the user reaction score and investment outcome.

12. The method of claim 11, wherein monitoring the reaction includes receiving, by the one or more processing circuits, an indication of a level of emotion induced by the displayed at least one augmented reality or virtual reality depiction, and wherein the user reaction score is generated by comparing the level of emotion to a baseline level of emotion.

13. The method of claim 11, wherein the plurality of investment outcomes are a plurality of first investment outcomes for a first investment risk level, the method further comprising:
  simulating, by the one or more processing circuits, a plurality of second investment outcomes for a second investment risk level;
  displaying, by the one or more processing circuits, at least one augmented reality or virtual reality depiction of at least one of the plurality of second investment outcomes to the user;
  monitoring, by the one or more processing circuits, the reaction of the user to each of the displayed at least one augmented reality or virtual reality depiction of the plurality of second investment outcomes; and
  generating, by the one or more processing circuits, an overall score for at least one of the plurality of second investment outcomes based on a second investment outcome.

14. The method of claim 11, further comprising receiving, by the one or more processing circuits, user information, wherein receiving the user information includes retrieving information concerning a financial account associated with the user from an account database associated with a financial institution computing system.

15. The method of claim 14, wherein receiving the user information includes receiving, by the one or more processing circuits, information from a computing device associated with the user indicating at least one user goal.

16. The method of claim 15, wherein displaying at least one augmented reality or virtual reality depiction of at least one of the plurality of investment outcomes includes:
  retrieving, by the one or more processing circuits, digital content from a content database associated with the financial institution computing system based on a characteristic of at least one of the plurality of investment outcomes and a characteristic of the at least one user goal; and
  transmitting, by the one or more processing circuits, the retrieved digital content to a display device.

17. A non-transitory computer readable medium having computer-executable instructions embodied therein that, when executed by a risk analysis circuit of a computing system, causes the computing system to perform operations comprising:
  simulating a plurality of investment outcomes;
  displaying at least one augmented reality or virtual reality depiction of at least one of the plurality of investment outcomes to the user;
  monitoring a reaction of the user to the displayed at least one augmented reality or virtual reality depiction, wherein monitoring the reaction includes measuring a biometric response of the user;
  generating a user reaction score by comparing the biometric response with a biometric response baseline; and
  generating an overall score for each of the plurality of investment outcomes by weighing the user reaction score and investment outcome.

18. The non-transitory computer readable medium of claim 17, wherein monitoring the reaction includes receiving an indication of a level of emotion induced by the displayed at least one augmented reality or virtual reality depiction, and wherein the user reaction score is generated by comparing the level of emotion to a baseline level of emotion.

* * * * *